United States Patent

Kousek et al.

[11] Patent Number: 5,829,147
[45] Date of Patent: Nov. 3, 1998

[54] APPARATUS FOR APPLYING MARKS TO SURFACES

[75] Inventors: Heinz Kousek, Feldkirch, Austria; Hans Gschwend, Buchs, Switzerland; Martin Noser, Vaduz, Liechtenstein

[73] Assignee: Hilti Aktiengesellschaft, Schaan, Liechtenstein

[21] Appl. No.: 915,786

[22] Filed: Aug. 21, 1997

[30] Foreign Application Priority Data

Aug. 29, 1996 [DE] Germany .................. 196 34 800.5

[51] Int. Cl.$^6$ .................. G01C 15/06; B23H 7/04
[52] U.S. Cl. .................. 33/293; 33/296; 33/666
[58] Field of Search .................. 33/1 CC, 293, 33/294, 295, 296, 367, 574, 666

[56] References Cited

U.S. PATENT DOCUMENTS

| | | | |
|---|---|---|---|
| 4,029,415 | 6/1977 | Johnson | 33/294 |
| 4,382,337 | 5/1983 | Bendick | 33/574 |
| 4,653,910 | 3/1987 | Poling | 33/294 |
| 4,752,156 | 6/1988 | Owens . | |
| 5,129,154 | 7/1992 | Aydelott | 33/666 |
| 5,367,782 | 11/1994 | Izumitani | 33/367 |
| 5,551,159 | 9/1996 | Mooty | 33/294 |
| 5,621,975 | 4/1997 | Rando | 33/293 |

FOREIGN PATENT DOCUMENTS 4013950  11/1991  Germany .
9617222   6/1996  WIPO .

OTHER PUBLICATIONS

European Search Report, No. EP 97 810 390.1 dated Jan. 8, 1998.

English Language Abstract of German 40 13 950 dated Nov. 7, 1991.

*Primary Examiner*—G. Bradley Bennett
*Attorney, Agent, or Firm*—Anderson, Kill & Olick, P.C.

[57] ABSTRACT

Apparatus (1) for applying marks to surfaces, such as walls and ceilings, particularly for use in home and building construction, includes a photoelectric detector device (21–25) for detecting bundled light signals from a light source, such as a laser, arranged at a distance from the surface to be marked. A signal-generating positioning aid (27–28) cooperates with the detector arrangement (21–25) for enabling a user of the apparatus to position it on the surface based on the detected light signals. In addition, the apparatus includes a marking device for applying a mark to the surface when the apparatus is correctly positioned.

11 Claims, 3 Drawing Sheets

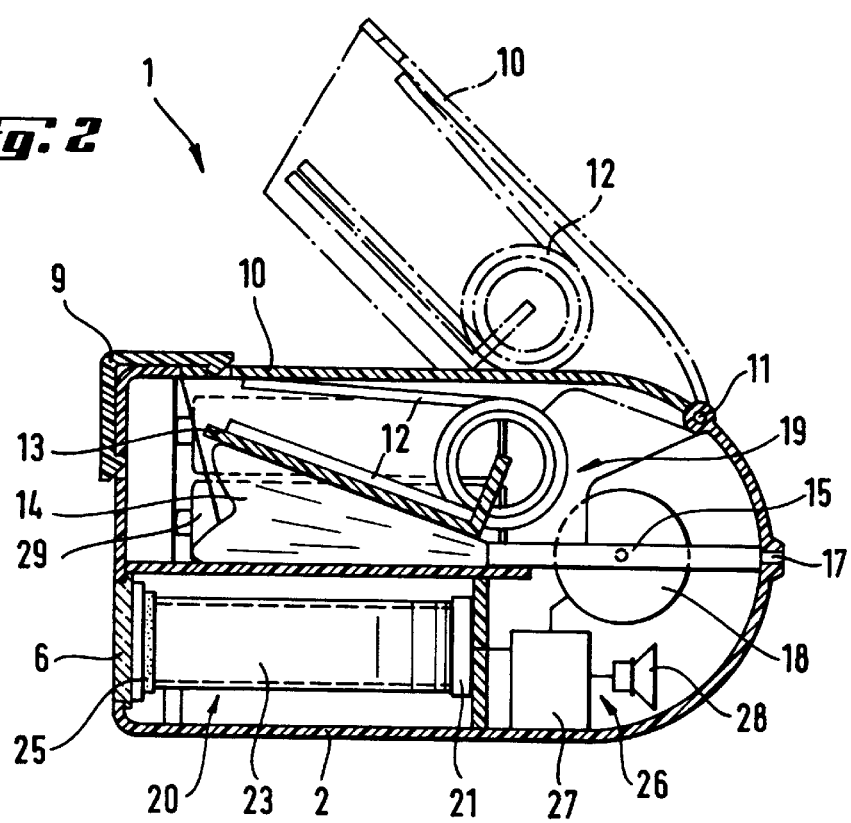
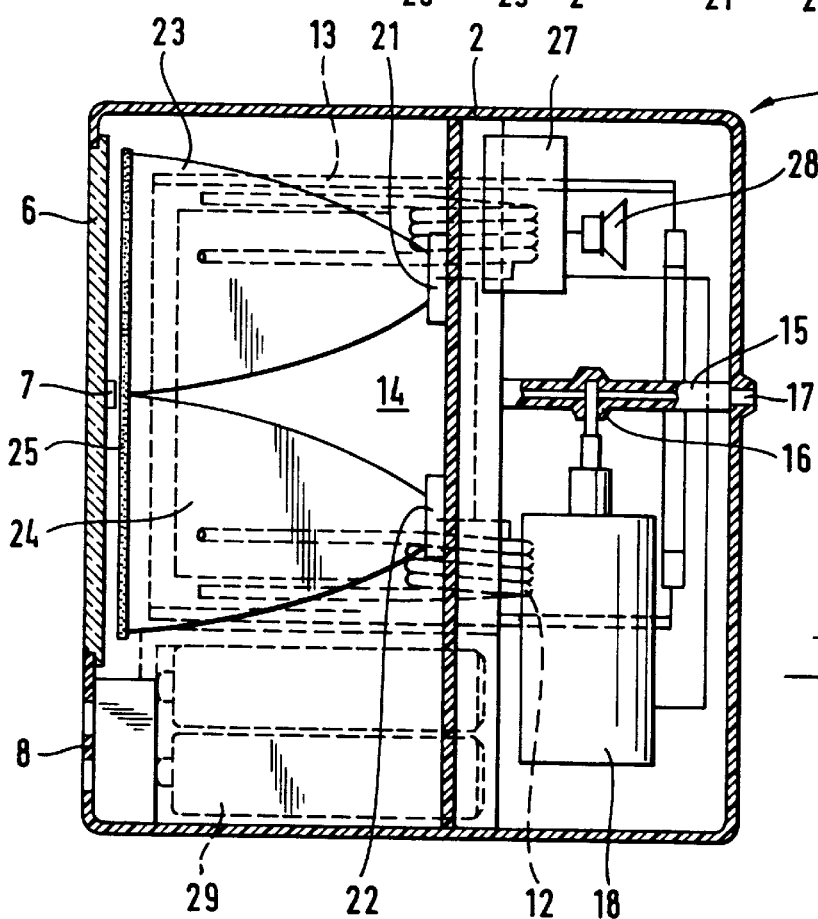

APPARATUS FOR APPLYING MARKS TO SURFACES

BACKGROUND OF THE INVENTION

The present invention is directed to an apparatus for applying marks to surfaces, such as walls and ceilings and includes a photoelectric detector device for detecting light signals from a light source spaced a distance from a surface to be marked. A signal-generating position aid cooperates with the detector device for enabling a user of the apparatus to position it on the surface based on the detected light signals.

Producing fastening points or locations where fastening members are to be secured involves measuring, positioning and marking the desired fastening point followed by the actual placement of the fastening member at the marked fastening point. The fastening operation can include the preparation of boreholes for receiving suitable fastening members, such as anchors, dowels and screws. The fastening process, however, can also be carried out by a direct setting procedure in which a bolt or similar fastening member is driven directly into the base material, for example, by a explosive powder charge actuated setting device. A substantial portion of the time required for establishing the fastening point involves the measuring operation positioning the fastening point and marking it. Therefore, with a large number of fastening points, a considerable expenditure of time and labor must be taken into account for the measuring, positioning and marking operations and/or providing the scaffolding which is used.

Where the fastening elements are to be inserted at considerable heights, a particular problem is experienced, since auxiliary means such as ladders, platforms or scaffolds are required for measuring the fastening points and applying the marks, such as where the marks are located on a ceiling or on a wall closely below the ceiling. As an example, if an intermediate or hung ceiling is to be installed, fastening points must be measured and marked over the entire surface of the ceiling. Accordingly, to gain access to the fastening points, a ladder or platform must be moved about the entire room. To measure and mark the fastening points, the ladder or platform must be climbed frequently. The same operations must be carried out, in mounting a suspended cableline or pipelines and the like. Measuring and marking fastening points is still often carried using tape measures and markers such as pencils, chalk or construction crayon to mark a point, cross or similar locating feature on the wall or ceiling of a planned position. Other tools such as chalk lines or marking wheels and the like are also known for locating lines on surfaces.

Modern laser technology simplifies the measuring, positioning and marking operation to some extent and makes it possible to locate the mark from a distance. The desired point or location is projected onto a surface, such as a wall or ceiling, by a bundled laser beam. By periodically rotating or deflecting the laser beam, lines can also be projected on the surface located at a distance from the laser. A permanent mark at the location of a projected point of line cannot be formed by the laser itself, since for safety reasons the laser beam output must be kept low. In general, the maximum permissible laser beam output for such laser systems is only approximately 2 mW whereas outputs of several 100 W would be necessary for directly producing permanent visible marks on walls or ceilings using the laser beam. Accordingly, the point or line projected onto the wall or ceiling from a distance must still be drawn or applied by a user. Marks are still made in a traditional fashion where the user draws a point or cross at the projected fastening point with a pencil, chalk or construction crayon.

Under bright lighting conditions and at great distances, the laser beam output is often inadequate for making the projected point or line visible on the irradiated surface. To remedy this problem, auxiliary devices are known which record the laser beam by means of photoelectric detectors. The detectors, arranged in a line, are connected with a positioning aid which informs the user of a direction in which the user is to move the auxiliary device to bring a center position into exact alignment with the projected point. For this purpose, the positioning aid generates different acoustic signals as a function of the position of the auxiliary device. The type of signal tells the user the direction in which the auxiliary device is to be moved, so that the laser beam strikes the center position. When the position of the projected point agrees with the center position, a signal is generated, for example, by a continuous tone. A mark provided by the auxiliary device indicates the correct position on the wall and serves as an aid for the user who marks the indicated position with a pencil, chalk or the like. Other equipment, such as ladders, platforms or scaffolding, still must be shifted within the room for applying the required marks. Accordingly, the user must still climb up and down the ladders or platforms until all the marks have been made.

SUMMARY OF THE INVENTION

Therefore, the primary object of the present invention is to provide an apparatus which facilitates the location and application of marks on ceilings and walls, particularly at high wall and ceiling locations. The apparatus is usable along with known laser positioning systems and is simple to operate.

In accordance with the present invention, an apparatus for applying marks to surfaces, such as walls and ceilings, includes a marking device for applying a mark to the surface when the apparatus is correctly positioned. The apparatus embodying the present invention is designed primarily for use in home and building construction and comprises a photoelectric detector device for detecting bundled light signals form a light source, preferably a laser, arranged at a distance from the surface to be marked and a signal-generating positioning aid which cooperates with the detector device, so that the user can position the apparatus on the surface to be marked in accordance with detected light signals. In addition, the apparatus includes a marking device for applying a mark to the surface when the apparatus has been correctly positioned.

Based on the invention, the marking device is a component part of the apparatus. This feature simplifies the apparatus so that it can be operated remotely. It is no longer necessary for the user to be at the specific location of the fastening point for transferring the mark to the surface. Pencils and other marking materials can be dispensed with, since the apparatus can be activated at the correct position to produce the mark.

In an advantageous embodiment of the invention, the detector device, positioning aid and marking device are located in a housing swivelably mounted on a telescoping lance and outfitted with support rolls for guiding the marking device over the surface being marked. When fastening points are to be placed on a ceiling or at a high location on a wall, it is no longer necessary for the user to climb a ladder or platform. The lance with the marking device at one end can telescope outwardly to the desired length. The user of the apparatus positions himself below the portion of ceiling or wall where the mark is to be applied with the apparatus according to the invention mounted on the lance. The lance is outfitted in the region of the marking device with support rolls so that it can be moved along the ceiling or wall. The detector is oriented so that the photoelectric device detects the light signal. The swivelability of the apparatus along with the positioning aid facilitates the alignment of the apparatus. The signal generated by the positioning aid based on the detected light signal, assists the user in correctly positioning or locating the apparatus. As soon as the apparatus is correctly positioned, a mark can be applied to the determined position by the marking device. All of these operations can be carried out by the user from the floor and he does not need to move from the floor to apply the mark to the surface.

The apparatus can be outfitted with a manually operated trigger for the marking device. As soon as the generated signal informs the user that the apparatus is correctly positioned, the user can actuate the remote trigger located on the lance and place the marking device in operation. The marking device, however, is preferably coupled with the detector arrangement, so that it can be activated automatically when it is determined that the apparatus is correctly positioned.

In one embodiment, the marking device can be a bolt resembling a punch and can be activated when the correct position is reached so that a small depression can be formed in the surface. Advantageously, however, the marking device comprises a spray device for a marking medium such as ink, watercolor or the like. A bolt acting as the marking device requires a relatively great amount of energy to produce a clearly visible depression, particularly in a very hard based material. A marking device working as an ink spraying device is simple to operate, needs comparatively little power, and its use is reliable and tested. The ink or water color marks are clearly visible and can be adapted easily with respect to the color of the marking by employing a marking medium of the desired color in the marking device.

In a preferred arrangement, the marking medium is located in a reservoir, under pressure during operation, and can be dispensed via an automatically actuated dispensing nozzle with an outlet opening facing the surface to be marked during operation. The combination of a reservoir for the marking medium, under pressure during operation, and a dispensing valve normally closed, allows the mark to be applied with little expenditure of energy. The dispensing valve is actuated, for example, by a solenoid, which, in turn, can be actuated by the signal generated when the correct marking position is established. The solenoid opens the valve briefly and the marking medium, ink or a watercolor, held in the reservoir, is sprayed onto the surface at the desired marking point through the outlet opening facing the surface.

To prevent erroneously making several successive marks at the same location, the marking device is connected with switching electronics allowing the marking device to be blocked for presettable time intervals. Accordingly, even if the signal indicating the correct position is adjusted and is generated repeatedly, as can occur by means of a periodically rotating light beam, it is ensured that the adjusted position is only marked once.

In a preferred embodiment of the invention, the detector device comprises two groups of photoelectric detectors arranged in a line on both sides of a center position and, in cooperation with a positioning aid, informs the user by generating a signal regarding the direction in which the apparatus must be moved so that the light signal strikes the center position. Preferably, a beam splitter is arranged at the center position. The beam splitter divides the incident light signal into two parts with the signal of each light path directed to one of the detectors. This arrangement is simple to produce and is particularly economical with regard to circuitry.

The signals generated when the light beam is detected by the positioning aid can be displayed to the user, for example, by a LED display which shows by color or position which of the detectors has been struck by the light beam. It has proven to be advisable, that the signals generated by the positioning aid are acoustic signals. The acoustic signals generated during the detection of the light signal by the detectors on one side of the center position differ from the acoustic signals which are generated during the detection by the detectors on the opposite side. For example, the signals are pulsed tones at different frequencies. In this way, the user is notified of the direction in which the apparatus must be moved for the light beam to strike the center position of the detector device. The fact that the center position has been reached can be signaled by a continuous tone generated when the light signal divided by the beam splitter at the location of the center position strikes the photoelectric detectors at both sides of the center position.

Preferably, the detector arrangement is formed by at least two photoelectric detectors each arranged on an opposite side of the center position and an essentially parabolic reflector is located in front of each detector so that the light signals infringing at an angle are also detected by the detectors with the parabolic reflectors serving to concentrate the incident bundled light signals on the photoelectric detector. In this way, it is also possible to detect light signals of inexactly bundled light sources occurring especially when using light sources that do not emit coherent light. An inexact alignment of the light source and a slight inclination of the apparatus can be compensated. Errors occurring in such an operation are negligible for the purpose of applying marks. The detector arrangement is advantageously preceded by a filter arrangement substantially transparent only for the wavelengths of the light signal emitted by the source. The filter arrangement is exchangeable so that the apparatus can be adapted for use with different light sources. As a result, only the light signal emitted by the light source reaches the detector device. Erroneous operation of the marking device due to incident extraneous light can be prevented.

BRIEF DESCRIPTION OF THE DRAWING

In the drawing:

FIG. 2 is a cross-sectional view taken transversely of the long dimension of the apparatus as viewed in FIG. 1;

FIG. 3 is a cross section taken in the long direction of the apparatus in FIG. 1.

DETAILED DESCRIPTION OF THE INVENTION

Figure 1:
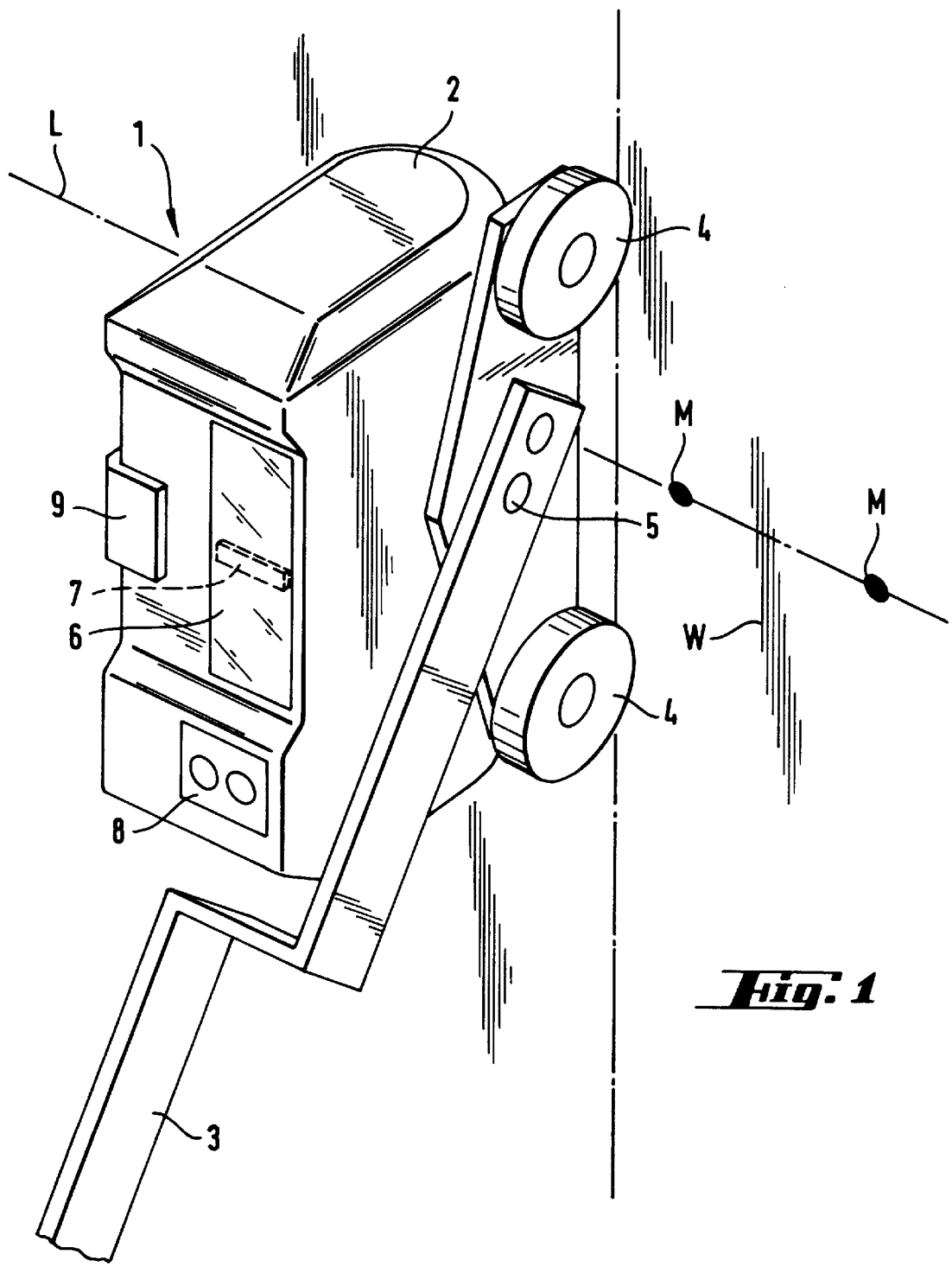
FIG. 1 is perspective view of the apparatus embodying the present invention.

In FIG. 1 an apparatus 1 embodying the invention is illustrated. The apparatus' includes a housing 2 made of plastics material and attached to an elongated lance 3, shown only in part, and preferably extendable in a telescopic manner. The housing 2 has a long dimension extending vertically as viewed in FIG. 1 and a transverse dimension extending horizontally. The housing is swivelable as indicated by the swivel joint 5. The lance 3 is mounted on rollers 4 located adjacent to the housing. The rollers 4 afford ease for guiding the housing along a surface of a wall for detecting the light signal of a preferably coherent light source by a detector behind a signal inlet window 6, formed of Plexiglas, in the housing 2, note FIG. 1. The apparatus 1 is arranged to apply marks M along a track projected on a surface of a wall or ceiling by a light sour light source. A center position 7 is shown in dashed lines and is positioned approximately in the middle of the long dimension of the signal inlet window 6, the center position plays an important part in positioning the apparatus for applying marks and its function will be explained hereinafter in further detail. Below the window 6 a control panel 8 is provided in the housing by which the apparatus can be switched on and off. The control panel 8 can also be provided with displays indicating the operation-readiness of the apparatus. A snap closure 9 locks a swivel cover, note FIG. 2, articulated on a side of the housing 2, not shown in FIG. 1, and affords access to the interior of the apparatus 1.

As indicated above, in FIGS. 2 and 3 the apparatus shown in transverse section and in longitudinal section. For reasons of simplicity, the drawing is restricted to the components of the apparatus 1 essential for understanding the invention. A detector device 20, a positioning aid 26 and a marking device 19 are arranged within the housing 2. The detector device 20 comprises at least two photoelectric detectors 21, 22 each arranged on an opposite side of the center position 7 inwardly of the signal inlet window 6, note FIG. 3. Essentially parabolic reflectors 23 and 24 are positioned between the photoelectric detectors 21, 22 and the center position and guide the light signals impinging at different angles to the corresponding photoelectric detector. A filter arrangement 25 is located immediately inwardly of the inlet window 6 and substantially passes only the wavelength(s) of the light signal impinging from the light source. Advantageously, the filter arrangement is located in the housing so that it can be easily replaced whereby the apparatus can be adapted to different light sources. For this purpose, the photoelectric detectors 21, 22 can also be arranged so as to be easily exchangeable. A beam splitter, not shown, for dividing the occurring light signal into two portions directed to the two detectors is preferably located at the center position 7.

The detector device 20 is connected with a positioning aid 26 including electronics 27 and a signal generator 28. The electronics 27 include signal amplifiers and comparators for determining which of the photoelectric detectors 21, 22 is struck by the light signal. Depending on which of the detectors 21, 22 is struck by the light signal, the electronics 27 generate a signal and activates the signal generator 28. In the embodiment shown in the drawing, the signal generator is a small loud speaker which generates tones of different frequencies and notifies the user how the position of the apparatus must be changed so that it is correctly positioned. When correctly positioned, the light signal strikes the beam splitter arranged at the center position 7 and the beam splitter divides the signal and guides it to the two detectors 21, 22. In this arrangement, a light signal is detected by both photoelectric detectors 21, 22 and is conveyed by the electronics 27 in the form of electrical pulses. The electronics 27 then excites the signal generator 28, for example, to generate a continuous tone notifying the user that the apparatus is correctly positioned. A power source 29 integrated in the housing 22, in a form of batteries or accumulators provides the required power for the electronics for amplifying the signals and for operating the signal generator 28. The electronics 27 are not described in more detail, since a person skilled in the art will be familiar with their construction.

In addition to the detector device 20 and the positioning aid 26, the apparatus 1 includes a marking device 19 permitting a mark to be applied to the surface, such as a wall or ceiling, when the apparatus is positioned correctly. The marking device 19 comprises a spray device for a marking medium such as ink or watercolor. In the embodiment shown in the drawings, the spray device includes a reservoir 14 containing the ink or watercolor under pressure, and a dispensing nozzle with an outlet opening 17 facing the surface to be marked when the apparatus 1 is operating. In the illustrated embodiment, the outlet opening 17 for the marking medium is arranged at the opposite side of the housing 2 from the signal inlet window 6 generally opposite the center position 7. The dispensing nozzle is closed in normal operation by a clamping element 16 operated by a solenoid 18. To apply a mark, the dispensing nozzle is opened briefly by the clamping element 16 displaced by the solenoid 18. As a result, a defined amount of ink or watercolor contained in the reservoir 14 under pressure, is sprayed through the outlet opening onto the surface to be marked. According to the embodiment of the invention shown in the drawings, the ink or watercolor is held in a bag 14 with pressure being applied on the bag 14 via a clamping plate 13. The clamping plate 13 is acted upon by a spring 12 attached to the swivel cover 10. The swivel cover 10 is articulated at the housing by a pivot member 11 and allows access to the interior of the housing, for example to insert a new ink bag or watercolor bag 14 or to change the batteries 29. Note in FIG. 2 that the cover 10 is shown in the outwardly pivoted position in dashed lines. When the swivel cover 10 is closed, the spring 12 presses against the clamping plate 13 which, in turn, keeps the bag under pressure. The swivel cover 10 is locked by the snap closure 9.

In the embodiment of the invention illustrated in the drawings the outlet opening 17 for the marking medium is arranged on the side of housing opposite the signal inlet window 6. This arrangement is optional. In principle, the outlet opening 17 can also be provided at other positions in the housing. It is only necessary that the spatial relationship between the center position 7 of the detector arrangement 20 and the outlet opening 17 for the marking medium be suited to the application. In the illustrated embodiment, the marking device 19 is incorporated in the housing 2 along with the detector device 20 and the positioning aid 26. The marking device, however, can also be accommodated in a separate housing and can be arranged spatially separate from the detector device and the positioning aid from and the lance 3.

A mark can be initiated manually by a trigger, not shown, located on the apparatus or the lance. Preferably, the marking device is triggered automatically. Accordingly, when the apparatus is correctly positioned, not only is a pulse transmitted from the electronics 27 to the signal generator 28 to generate a continuous tone, but a pulse is also sent to the solenoid 18 for briefly releasing the clamping element 16, in particular for lifting the clamping element 16, so that ink or watercolor can pass through the outlet opening 17 and reach the surface to be marked. To prevent an additional mark from being made at the same location after the initial mark has been applied, the electronics 27 preferably contain a timing filter which makes it possible to block the marking device for presettable time intervals. The electronic circuit required that this purpose is conventional and familiar to persons skilled in the art, so that a detailed description is unnecessary.

Figure 4:
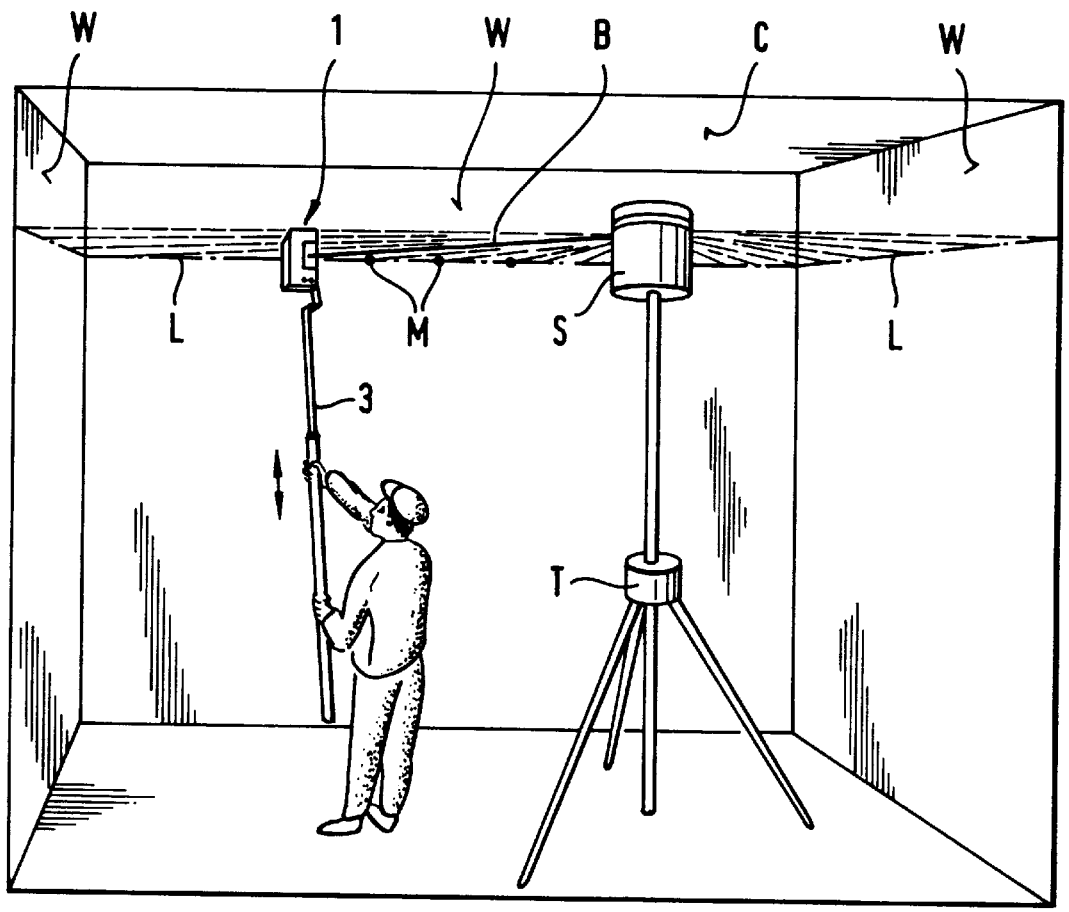
FIG. 4 is a perspective view showing the apparatus of the invention in use.

In FIG. 4 the apparatus 1, embodying the invention, is shown in use. The apparatus 1 is used to apply marks M to the walls W at a determined spacing below the ceiling C. For this purpose, a rotating construction laser S of a known type is first adjusted with respect to height. The construction laser S is mounted on a vertically adjustable tripod T and enables a accurate alignment of the construction laser S. The laser beam A emitted by the rotating construction laser, generates a light track L on the walls W with the track passing along the walls W at the desired spacing below the ceiling C. Given a sufficiently rapid rotating speed of the construction laser S, the light track appears permanently on the walls W, assuming favorable light conditions on contrast conditions. Due to the low output of the construction laser S, however, the light track L is often not visible to the naked eye in bright light or under unfavorable contrast conditions. The apparatus 1, according to the invention, also helps the user to detect the light signal D under unfavorable conditions. When employing the apparatus 1 according to the invention, the user can apply marks at great heights without the need of ladders or platforms. The apparatus 1 mounted on the lance 3 can be extended telescopically in the vertical direction at the wall until the light signal D reaches the detector device. The acoustic signal tells the user how to change the position of the apparatus so that the light signal D passes through the center position 7. As soon as this occurs, the user is informed acoustically and the mark is applied simultaneously. In this way, the user can move along the wall to apply marks M at desired intervals.

While specific embodiments of the invention have been shown and described in detail to illustrate the inventive principles, it will be understood that the invention may be embodied otherwise without departing from such principles.

We claim:

1. Apparatus for applying marks to surfaces, such as walls and ceilings, in home and building construction, comprising a housing (2), a photoelectric detector (20) located in said housing, detector device for detecting bundled light signals (B) of a light source (S) located at a distance from a surface to be marked, a signal-generating positioning aid (26) within said housing and cooperating with said detector device for enabling a user of the apparatus to correctly position said housing on the surface based on detected light signals (D), and a marking device (19) for applying a mark to the surface when the apparatus is correctly positioned.

2. Apparatus as set forth in claim 1, wherein said marking device is located within said housing (2).

3. Apparatus, as set forth in claim 2, wherein said detector device (20), said positioning aid (26) and said marking device (19) within said housing are swivelably mounted on a telescoping lance (3) with support rolls (4) mounted on said lance for guiding said housing along the surface.

4. Apparatus, as set forth in claim 1, 2 or 3 wherein said marking device (19) is automatically activated when it is detected that said apparatus (1) is correctly positioned.

5. Apparatus, as set forth in claim 1, 2 or 3, wherein said marking device (19) comprises a spray device for a marking medium, such as one of ink and watercolor.

6. Apparatus, as set forth in claim 5, wherein said marking medium being arranged in a reservoir (14) within the said housing and said reservoir being under pressure during operation and arranged for dispensing the marking medium through an automatically actuated dispensing nozzle (15) having an outlet opening (17) facing the surface to be marked.

7. Apparatus, as set forth in claim 5, wherein said marking device is connected with electronics (27) for blocking the marking device for presettable time intervals.

8. Apparatus, as set forth in claim 1, 2 or 3, wherein said detector device (20) includes two groups of photoelectric detectors (21, 22) each arrayed in a line on opposite sides of a center position (7) in said housing and cooperating with said positioning aid (26) for informing the user by generating a signal regarding the direction the apparatus (1) must be moved so that the light signal (B) strikes the center position (7), and a beam splitter located at the center position (7) for splitting the incident light signal (B) into two parts each directed to one of said photoelectric detectors (21, 22).

9. Apparatus, as set forth in claim 8, wherein said positioning aid (26) generates acoustic signals.

10. Apparatus, as set forth in claim 8, wherein said detector device (20) comprises an essentially parabolic reflector (23, 24) arranged between said center position and each of said photoelectric detectors (21, 22) for concentrating the incident bundled light (B).

11. Apparatus, as set forth in claim 1, 2 or 3, wherein said housing (2) contains an inlet window (6) spaced from said detector device (20) with an exchangeable filter (25) substantially transparent only for wavelengths of the lights (B) emitted by the light source and positioned between said inlet window (6) and said detector arrangement (20).

* * * * *